Patented Apr. 7, 1942

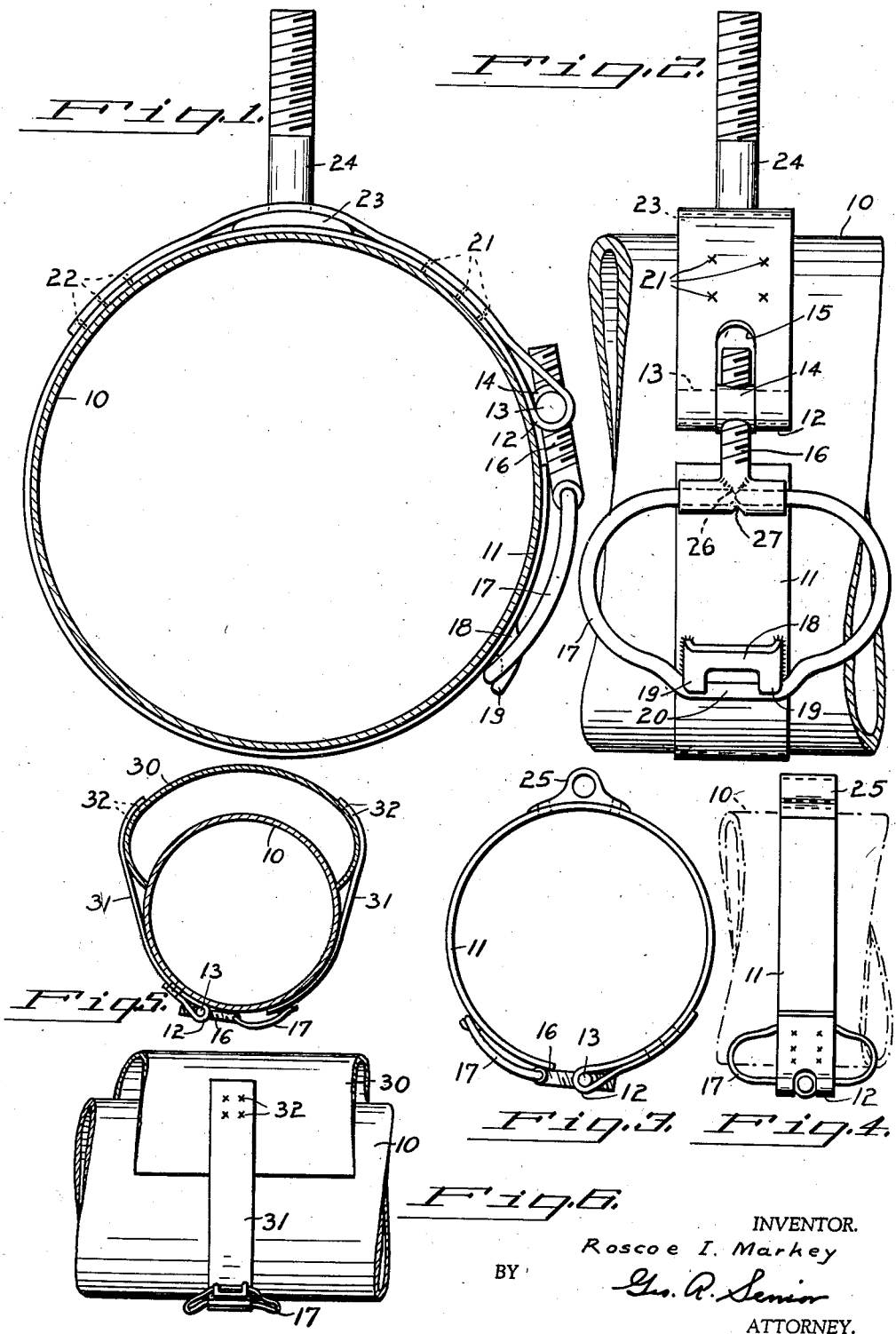

2,279,090

UNITED STATES PATENT OFFICE 2,279,090

EXHAUST MANIFOLD SUPPORT PIPE CLAMP

Roscoe I. Markey, East Orange, N. J., assignor to Pollak Manufacturing Company, Arlington, N. J., a corporation of New Jersey Application July 25, 1940, Serial No. 347,375

3 Claims. (Cl. 248—71)

The invention relates to exhaust manifold support pipe clamps and is particularly adapted for use in connection with exhaust manifold systems for aircraft engines.

In such systems it is often desirable to clamp or rigidly secure associated parts to the system. The manifold system being placed in close proximity to the engine there is considerable expansion and contraction in the entire system due to the great heat developed by the engine while in operation. It is therefore impossible or highly impractical to provide a rigid clamp.

The principal object of the present invention is to provide a support pipe clamp that will efficiently serve in such exhaust manifold system.

Another object of the invention is to provide an exhaust manifold support pipe clamp which is extremely simple in construction thus lending itself to economy of manufacture and ease of installation.

Other objects and advantages will appear as this specification proceeds. Referring to the drawing forming a part thereof and in which preferred embodiments of the invention are illustrated:

Fig. 1 is an edge view of the clamp, the pipe being in section;

Fig. 2 is a side elevation;

Figs. 3 and 4 are an edge view and side elevation, respectively, of a slightly modified form of the invention; and Figs. 5 and 6 are an edge view and side elevation, respectively, of another modification.

The principle involved in the present invention is similar to that of my copending application, Serial No. 296,799, filed September 27, 1939, and allowed June 12, 1940 now Patent No. 2,226,936, dated December 31, 1940.

Referring again to the drawing and particularly to Figs. 1 and 2 the reference numeral 10 designates a fragmentary part of some member of an exhaust manifold system to which it is desired to clamp an associated part or element. The clamp comprises a split band 11 preferably formed of a continuous strip of metal.

At one end the strip is bent back on itself so as to form an eye 12. Rotatably mounted in the eye 12 is a pin 13 which has an enlarged portion 14 confined in a slot 15. The enlarged portion 14 prevents any endwise movement of the pin and is threaded for the reception of a T-shaped hinge member 16. The cross portion of the T-shaped member is drilled out to receive the ends of a resilient ring-like locking member 17.

A block or locking lug 18 is welded or otherwise secured to the band on the opposite side of the gap. The locking lug is provided with a pair of ears 19, 19 and an undercut portion for the reception of the locking ring. The resilient locking ring has an offset portion 20 substantially the width of the locking lug. Thus when the resilient locking ring is sprung under the ears 19 it cannot be displaced laterally and due to the shape and resiliency of the locking member the clamping band may readily expand or contract and yet at all times be firmly and rigidly locked in position. Having the T-shaped member threaded into the pin 13 permits of adjustments for different diameters of pipe.

The shape of the block 18 and its locking ears 19 permit of a suitable tool being applied to lock or unlock the clamp. This tool has a curved end and in locking the clamp it is slipped under the ring and into the opening between the ears. The ring then readily rides over the tool into its locked position. In opening the clamp the tool is reversed and the ring is easily and quickly moved from under the ears to its released position.

The strip 11 continues on from the formation of the eye 12 and is resistance welded to itself at 21 and 22. Between the two layers of the strip and the resistance welds 21 and 22 is the flat head 23 of a threaded stud 24, the stud projecting through an aperture in the outer layer of the strip. The stud is thus firmly secured to the clamp in a simple manner and may be used for supporting or carrying any desired associated part.

The ends of the resilient locking ring 17 abut each other in the cross portion of the T-shaped hinge member 16 and are ground or chamfered as indicated at 26 in Fig. 2. After assembly an indentation or dimple 27 is formed in the cross portion and this indentation engages what might be termed the groove formed by the chamfered abutting ends and accidental disassembly or displacement of the locking ring 17 is prevented.

The modification shown in Figs. 3 and 4 is quite similar to the form of Fig. 1 and like parts bear like reference numerals. In this form that part of the strip which is bent over on itself to form the eye 12 terminates beyond the eye and the support attachment 25 is of somewhat different nature and is resistance welded to the clamp.

In the modification illustrated in Figs. 5 and 6 a hot air duct 30 is clamped to the exhaust manifold number 10. The clamp 31 might extend all around the hot air duct or as illustrated be formed of two pieces having their ends resistance welded to the hot air duct as indicated at 32. In both modifications the resilient locking mechanism is the same as that described in connection with Figs. 1 and 2.

Such changes in details of construction and arrangements of parts as would occur to one skilled in the art are to be considered as coming within the spirit of the invention as set forth in the appended claims.

I claim:

1. An exhaust manifold support pipe clamp having in combination, a split clamping member adapted to surround and snugly engage a member of an exhaust manifold system, means for firmly securing the ends of said split clamping member together, said means providing for diametrical expansion and contraction of said split clamping member, and comprising an eye formed in one end of said split clamping member, said eye being formed by bending the strip back on itself and securing the bent back portion to the body portion of the strip, a pin mounted in said eye, a hinge piece adjustably mounted in said pin, and a resilient ring-like locking member hinged in said hinge piece, said locking member engaging a locking lug on the other side of the opening in said split clamping member, and a stud, said stud having a flat head secured between the bent back portion of the strip and the body portion thereof.

2. An exhaust manifold support pipe clamp having in combination, a split clamping member adapted to surround and snugly engage a member of an exhaust manifold system, means for firmly securing the ends of said split clamping member together, said means providing for diametrical expansion and contraction of said split clamping member, and comprising a resilient ring-like locking member hinged adjacent the opening in said split clamping member, said locking member engaging a locking lug on the other side of said opening in said split clamping member, an offset portion in said locking member, the length of said offset portion being substantially the width of said locking lug, and said offset portion acting to prevent lateral movement of said locking member, and a supporting attachment secured to said split clamping member.

3. An exhaust manifold support pipe clamp having in combination, a split clamping member comprising a strip adapted to surround and snugly engage a member of an exhaust manifold system, one end of said strip being bent back on itself to form an eye, the bent back portion of said strip being secured to said strip, a pin mounted in said eye, a resilient ring-like locking member carried by said pin, a locking lug mounted adjacent the other end of said strip for engagement with said locking ring, and a stud, said stud having a flat head secured between the bent back portion of the strip and the body portion thereof.

ROSCOE I. MARKEY.